United States Patent Office 3,484,202
Patented Dec. 16, 1969

3,484,202
METHOD FOR THE QUALITATIVE IDENTIFICATION OF EPT ELASTOMERS
Panagiotis L. Panagoulias, Highland Park, Mich., assignor to the United States of America as represented by the Secretary of the Army
No Drawing. Filed Mar. 2, 1967, Ser. No. 621,109
Int. Cl. G01n 33/44
U.S. Cl. 23—230       7 Claims

ABSTRACT OF THE DISCLOSURE

A method for the qualitative identification of EPT elastomers, under all conditions of occurrence, comprising the steps of: nitrating a test sample with nitric acid; reducing the nitrated test sample with zinc and acetic acid; and, finally, reacting the test sample with P-dimethylaminobenzaldehyde; said method yielding a complex color producing compound having the following structural formula when the sample contains an EPT elastomer:

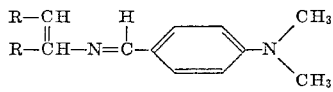

The invention described herein may be manufactured and used by or for the Government for governmental purposes without the payment to me of any royalty thereon or therefor.

The present invention relates to a method for the qualitative identification of EPT, ethylene-propylene terpolymers, i.e., copolymers of ethylene, propylene and a non-conjugated diene, elastomers under all conditions of occurrence. More particularly, the invention relates to a non-pyrolytic, addition reaction suitable for identifying EPT elastomers.

The qualitative methods for the identification of elastomers in general, and EPT elastomers in particular, which have been utilized in the prior art are begun almost universally by an initial pyrolysis which causes destructive distillation of the test sample. Subsequently, the vapors produced by the distillation are analyzed. The analysis is accomplished by reacting the vapors produced by the distillation with one or more reagent solutions, which yield a specific color identification in the presence of EPT elastomers. These methods very often yield ambiguous results, particularly when a number of elastomer compounds are present in the same test sample and the products of their individual distillations are mixed and then passed together through the reagent solutions to yield, at one time, the variety of colored reaction products which indicate the presence of each of the individual elastomers.

The present invention eliminates the necessity for pyrolysis of the test samples and provides a method which, by addition of certain chemical compounds to a properly prepared test sample, yields a distinct color reaction which provides a specific identification for the presence of EPT elastomers. EPT elastomers are identified by using a specific procedure which eliminates the interference of other polymers or mixtures of polymers which may be present in a test sample.

It is therefore an object of the present invention to provide a method for the qualitative identification of EPT elastomers under all conditions of occurrence.

Another object of the present invention is the provision of a nonpyrolytic and specific color producing method for the qualitative identification of EPT elastomers under all conditions of occurrence.

Still another object of the present invention is the provision of a method of qualitatively identifying EPT elastomers present as mixtures or compounds with other elastomers.

The following description will reveal other objects and advantages of this invention to those skilled in the analytical arts.

According to the present invention, there is provided a non-pyrolytic method for qualitatively identifying EPT elastomers under all conditions of occurrence.

More particularly, the invention provides a color producing qualitative method for the identification of EPT elastomers under all conditions of occurrence comprising the steps of: nitrating a test sample with nitric acid; reducing the nitrated test sample with zinc and acetic acid; and, finally, reacting the test sample with P-dimethylaminobenzaldehyde. The above method yields a specifically and distinctly colored solution when the test sample contains an EPT.

There is thus substituted for the pyrolysis and vapor analysis of the prior art, a strictly chemical test utilizing procedures which eliminate the effects or interference of any elastomers other than EPT elastomers which may be present as compounds or mixtures therewith.

According to the procedures herein disclosed, a portion of the elastomer sample to be tested is cut into small pieces and these small pieces extracted with acetone according to ASTM Procedure D-297 for an eight to ten hour period. The purpose of this extraction is the removal of all traces of vulcanization and as such it is primarily precautionary. The extraction may, therefore, be included or excluded from the testing process depending upon the nature of the sample under study. Once extraction is completed the sample is air dried at room temperature.

The air-dried sample is then transferred to a reaction vessel, such as a test tube, containing 80 ml. of 2,2,4-trimethylpentane or some other suitable solvent. The latter compound is chosen as solvent due to its chemical inertness toward almost all elastomer compositions and its excellent solubility properties. Thus, any other solvent with similar properties may be utilized. The mixture thus formed is then refluxed for a one to four hour period in order to insure proper solution of the sample in the solvent. In this manner a suitable test sample solution is formed, which solution will carry the sample through the subsequent testing steps.

Three ml. of nitric acid (sp. gr. 1.42) are added to the test sample solution. This mixture is heated at 120 degrees centigrade without a condenser in order to remove any excess, unreacted nitric acid which is present in the mixture. Once no more acid is evolved from the heated mixture, a four to five ml. portion of the mixture is transferred to another reaction vessel and 0.2 gram of zinc powder and 2 ml. of acetic acid added. This mixture is heated to 120 degrees centigrade for a brief period, five to ten minutes, in order to insure that the reduction reaction, described in detail below, is carried to completion.

The above mixture is cooled and the solution transferred to another reaction vessel containing 0.05 gram of P-dimethylaminobenzaldehyde. This mixture is shaken briefly and heated to boiling. When the test sample contains an EPT elastomer, a yellow color is produced. The reactions which give rise to the above color identification center about the double bond or ethylene groups of the compounds being tested for.

Initially, the nitric acid nitrates the double bond as follows:

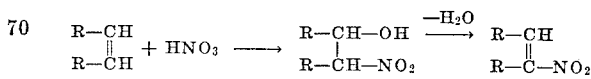

Continued heating and the addition of the powdered zinc and acetic acid result in the reduction of the nitro group to form the corresponding amine according to the reaction shown as follows:

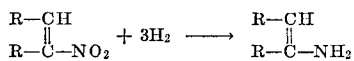

This amine, when reacted with the P-dimethylamino compound, yields the complex color producing compound as follows:

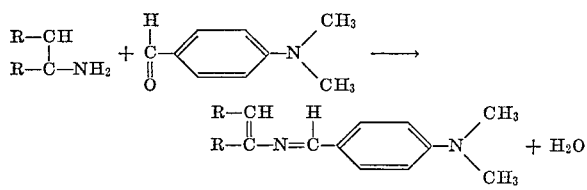

Natural rubber, polyisoprene rubber, neoprene, styrene, nitrile, polyurethane, polybutadiene, polyisobutylene and paracril elastomers give no color reaction with this method.

What is claimed is:

1. A method for the qualitative identification of EPT elastomers comprising the steps of:
   (a) nitrating a test sample with nitric acid;
   (b) reducing said nitrated test sample with zinc and acetic acid; and
   (c) reacting said nitrated and reduced test sample with P-dimethylaminobenzaldehyde to produce a complex color producing compound having the following structural formula:

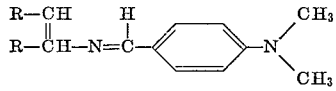

when said test sample contains an EPT elastomer.

2. A method in accordance with claim 1 wherein said test sample is extracted with acetone according to ASTM Procedure D–297 for an eight to ten hour period prior to being reacted with said nitric acid.

3. A method in accordance with claim 1 wherein said test sample is dissolved in 2,2,4-trimethylpentane to form a test sample solution prior to being nitrated with said nitric acid.

4. A method in accordance with claim 3 wherein said test sample is extracted with acetone according to ASTM Procedure D–297 for an eight to ten hour period prior to being dissolved in said 2,2,4-trimethylpentane.

5. A method in accordance with claim 3 wherein said test sample solution is refluxed for a two to four hour period immediately upon formation and prior to nitration with said nitric acid.

6. A method in accordance with claim 3 wherein said nitration of said test sample with said nitric acid is accomplished by heating to 120 degrees centigrade.

7. A method in accordance with claim 3 wherein said reduction of said test sample with said zinc and said acetic acid is accomplished by heating to 120 degrees centigrade.

References Cited

Burchfield, H. Chem. Abstr. 40, 3292[2], 1946.
Mano, E. B., Chem. Abstr. 57, 997f, 1962.
ASTM Standards on Rubber Products 1957, pp. 132, 133. TS1892A45.

MORRIS O. WOLK, Primary Examiner

R. M. REESE, Assistant Examiner